United States Patent [19]

Bevans et al.

[11] Patent Number: 5,141,092
[45] Date of Patent: Aug. 25, 1992

[54] LOW SPRING RATE MECHANICAL STOP

[75] Inventors: Leslie L. Bevans, Roscoe; Richard E. Walsh, Rockford, both of Ill.

[73] Assignee: Sundstrand Corporation, Rockford, Ill.

[21] Appl. No.: 593,741

[22] Filed: Oct. 5, 1990

[51] Int. Cl.⁵ .................................. F16D 71/00
[52] U.S. Cl. .............................. 192/139; 192/149
[58] Field of Search ............ 192/139, 149, 8 C, 138, 192/12 BA, 141; 188/371, 373; 267/136, 139, 169, 155, 157

[56] References Cited

U.S. PATENT DOCUMENTS

| | | | |
|---|---|---|---|
| 1,979,869 | 11/1934 | Charter | 267/155 X |
| 3,293,925 | 12/1966 | Linsley | 192/141 X |
| 3,326,054 | 6/1967 | Canick et al. | 192/141 X |
| 3,543,604 | 12/1970 | Korsgren | 192/141 X |

FOREIGN PATENT DOCUMENTS 0676788  7/1979  U.S.S.R. .................. 192/141

Primary Examiner—Rodney H. Bonck
Attorney, Agent, or Firm—Antonelli, Terry, Stout & Kraus

[57] ABSTRACT

A mechanical stop mechanism (15 or 15') adapted to be accommodated in a container (29) having at least one fixed stop (18, 19) defining a limit position for the stop mechanism (15 or 15'). The stop mechanism (15 or 15') includes a helical spring member (S) mounted on a hub (20), with the helical spring member (S) having an active spring length (l) dimensioned so as to absorb impacting forces of the stop mechanism (15 or 15') against the at least one fixed stop (18, 19) by compression of the material of the helical spring member (S).

5 Claims, 3 Drawing Sheets

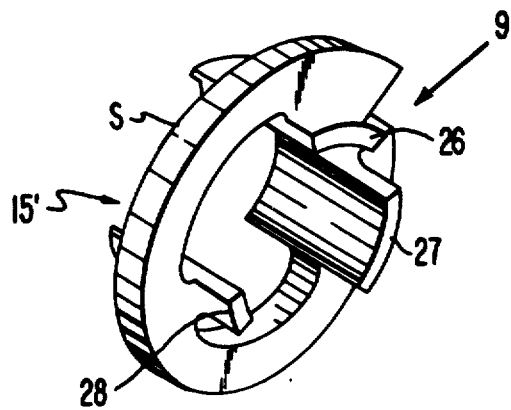
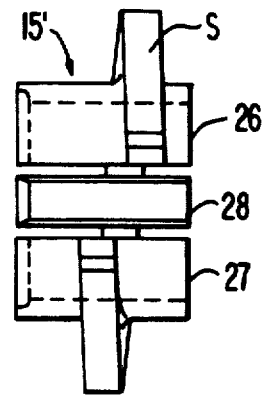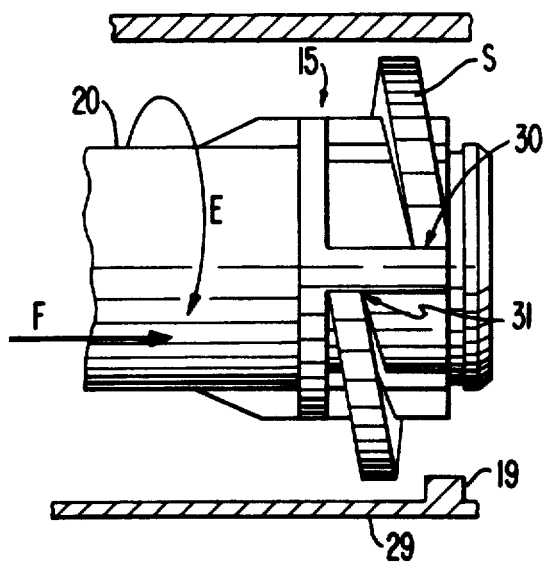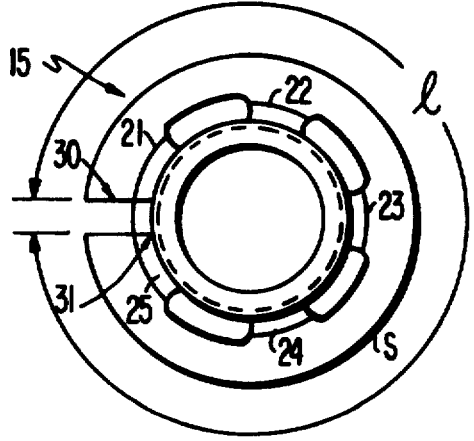

LOW SPRING RATE MECHANICAL STOP

DESCRIPTION

1. Technical Field

The present invention relates to a mechanical stop mechanism and, more particularly, to a mechanical stop that provides a low spring rate, with the mechanical stop being capable of absorbing shocks during a stopping operation by a compression of material of the mechanical stop along a length thereof.

2. Background Art

In, for example, the aircraft industry, relative motion sensing arrangements are widely used for example, in a secondary load path for a flap actuation system on an aircraft, with the relative motion sensors being adapted to provide, for example, an indication of the existence of a failure in either the primary or secondary load paths.

Typically, the relative motion sensing arrangements include an element axially displaceable as a result of relative rotation between two components in the respective load paths, with the element being displaceable between two end or limit positions defined by fixed stops. The element is displaced over a travel path representing a more or less free play area until impacting the fixed stops. An actuating member may be coupled to the axially displaceable element, with the actuating member being adapted to actuate a contact or switch means to provide a visual indication or warning of the occurrence of a failure in the primary or secondary load path.

One significant problem encountered in the conventional torque sensors resided in the fact that, upon completion of the travel or displacement of the axially displaceable element between the fixed stops defining the end of limit positions, the axially displaceable element impacted on the fixed stops with a considerable impact force and, after a number of impacts, the stops were peened over due to the high impact load of the axially displaceable element against the fixed stops. As the stops were peened over, the axially displaceable element would then stop short of the maximum stop overlap position and, consequently, would not displace the actuating member a sufficient amount to actuate the switch means or contact thereby failing to provide any indication of the existence of a malfunction.

DISCLOSURE OF THE INVENTION

The aim underlying the present invention essentially resides in providing a mechanical stop which is capable of reducing impact loading by having a significantly lower spring rate so as to cause a reduction in the forces of the high impact loading.

In accordance with advantageous features of the present invention, a mechanical stop mechanism is provided which is adapted to be accommodated in a container having at least one fixed stop for a unidirectional actuation or at least two axially spaced fixed stops for bi-directional operation. The mechanical stop mechanism includes a rotatable and axially displaceable helical spring member adapted to be brought into engagement with the at least one fixed stop, with the spring member having an active spring length dimensioned so as to absorb impacting forces of the stop mechanism against the at least one fixed stop by compression of the material of the spring member without a permanent deformation of the helical spring member.

The stop mechanism may include a hub means for supporting the helical spring member, with the helical spring member including a plurality of axially extending circumferentially spaced locator means arranged along an inner cylindrical surface thereof for concentrically locating the helical spring means with respect to the hub means.

The hub means may be adapted to be mounted on a rotatable axially displaceable sleeve member of a relative motion sensor, with the sleeve member including an actuator means for activating a signal means indicating an exceeding of a predetermined relative motion when the stop mechanism contacts the at least one fixed stop and the helical spring member has absorbed the impact forces.

By virtue of the features of the present invention, a stop mechanism is provided in the form of a limited deflection means with a significantly lower spring rate than an integral stop, with the stop mechanism relying upon an elasticity of the material of the stop mechanism to achieve a spring rate rather than separate spring mechanisms which add to complexity and overall package size.

The reduced spring rate is achieved in accordance with the present invention by increasing a length of material being loaded and by providing a contact surface which is separated from a reaction surface on a hub.

The stop mechanism may be fashioned as a torsional stop mechanism wherein the material of the stop mechanism is compressed and moves out against an enclosing cylinder which radially supports the same.

The stop mechanism of the present invention may be bi-directional or uni-directional, and the spring rate of the stop mechanism can be tailored to specific requirements by controlling a cross-section thereof.

By relying upon the elasticity of the material to achieve the spring rate, it is possible to dispense with the necessity of providing separate springs as well as to lower the reaction rate. Furthermore, by dispensing with the need for separate springs, the overall weight of the total package can be reduced while nevertheless providing a stop mechanism which is capable of reacting to high impact energies.

The above and other objects, features, and advantages of the present invention will become more apparent form the following description when taken in connection with the accompanying drawings which show, for the purpose of illustration only, one embodiment in accordance with the present invention.

BRIEF DESCRIPTION OF THE DRAWINGS

FIG. 6 is a side view of the stop mechanism of the present invention mounted on a hub;

FIG. 7 is an end view of the stop mechanism of FIG. 6;

FIG. 8 is a perspective view of another embodiment of the stop mechanism of the present invention; and FIG. 9 is a side view of the stop mechanism of FIG. 8 taken in the direction of the arrow 9 in FIG. 8;

BEST MODE FOR CARRYING OUT THE INVENTION

Figure 1:
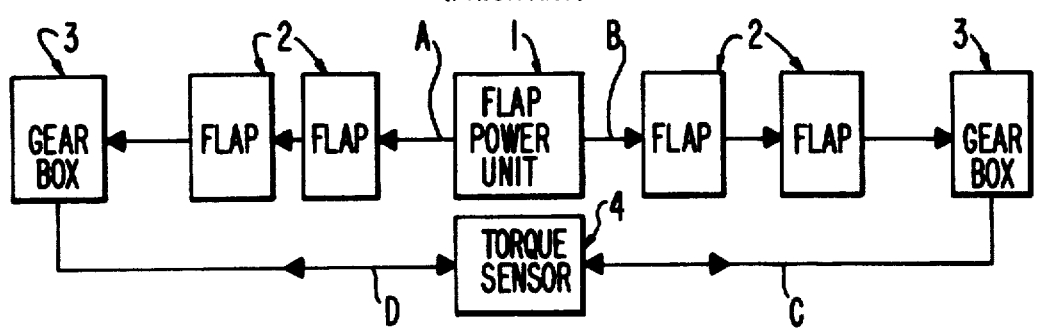
FIG. 1 is a schematic view of a conventional flap actuation system for an aircraft employing a secondary load path with a relative motion sensing arrangement.

Referring now to the drawings wherein like reference numerals are used throughout the various views to designate like parts and, more particularly, to FIG. 1, according to this figure, a conventional flap actuator system, for example, for a turbo-prop aircraft, includes a flap power unit generally designated by the reference numeral 1, disposed in a fuselage (not shown) of an aircraft, with the flap power unit driving out in both directions, through respective wings (not shown) of the aircraft, to actuate flaps generally designated by the reference numeral 2 by way of conventional ball screw actuators (not shown). The flap power unit provides a primary load path through shafts designated by the reference characters A, B, with the shafts A, B respectively terminating in gear boxes generally designated by the reference numeral 3. A secondary load path, formed by flexible shafts C, D, is arranged between the respective gear boxes 3, with a relative motion sensor generally designated by the reference numeral 4 being arranged within the secondary load path between the flexible shafts C, D forming the secondary load path.

In normal operation, the flap power unit 1 provides a drive through the drive shafts A, B. The shafts A, B and hence the flexible shafts C, D are rotating at the same speed and in the same direction. Upon a failure in either of the drive shafts A, B, a relative motion between the flexible shafts, C, D is sensed by the relative motion sensor 4 and the secondary load path becomes effective once the free play has been traversed and the stops engaged to provide the necessary actuating power to the flaps 2 in a conventional manner.

Figure 2:
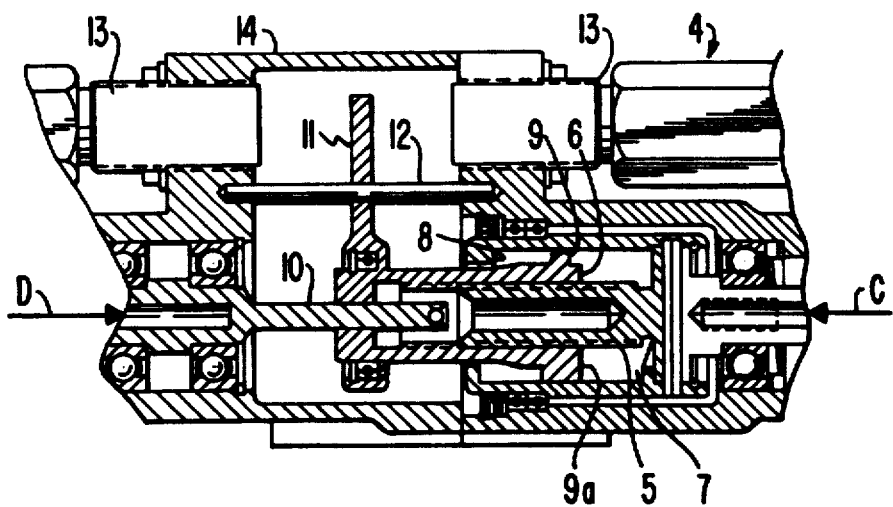
FIG. 2 is a partial cross-sectional view of the conventional relative motion sensor arrangement of FIG. 1.

As shown most clearly in FIG. 2, the conventional relative motion sensor 4 includes a threaded shaft portion 5 having mounted thereon a threaded sleeve or nut 6. The sleeve or nut 6 is provided with a radial projection 9 and end face 9a respectively adapted to be brought into abutment with fixed stops 8, 7 defining the end or limit positions of travel of the sleeve or nut 6. An actuating element is provided on the sleeve or nut 6 so as to be displaced therewith, with an axially extending pin means 12 being arranged in a portion of a housing 14 of the relative motion sensor 4 for stabilizing the actuating element. The actuating element 11 is displaceable between two switch means 13 and is adapted to actuate the respective switch means 13 when the sleeve or nut 6 is at the respective end or limit positions thereby resulting in an activation of a warning light (not shown) or the like to advise of a failure in the primary load path sensed by the relative motion sensor 4.

The flexible shaft C provides an input to one side of the relative motion sensor 4, with the flexible shaft D providing an input to the opposite side of the relative motion sensor 4. During normal operating conditions, both flexible shafts C and D are rotating at the same speed so that the threaded sleeve 6 and associated actuating element 11 assume the position illustrated in FIG. 2. However, upon a failure in one of the drive shafts A or B of the primary load path, the non-failed drive shaft A or B provides a drive resulting in a relative rotation between the flexible drive shafts C, D such that the flexible shaft D or C drives the sleeve or nut 6 so as to displace the same toward one of the fixed stops 7 or 8 depending upon the failed drive shaft A, B of the primary load. The impact loads caused by an impacting of the end faces of the projection 9a against either of the fixed stops 7 or 8 may result in a peening over of the stops 7 and/or thereby precluding the actuating element 11 from being displaced to a position sufficient for actuating the switch 13. Consequently, the operator of the aircraft would not be apprised of any failure in the primary load path.

Figure 3:
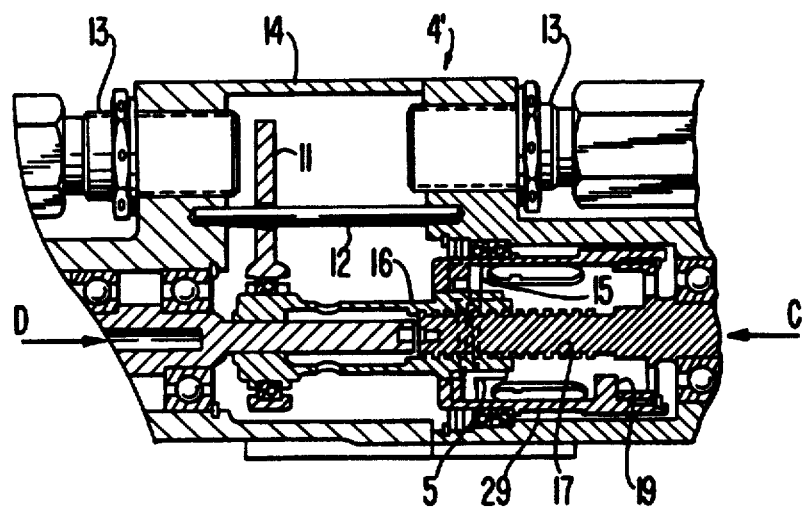
FIG. 3 is a partial cross-sectional view of a torque sensor arrangement employing a stop mechanism constructed in accordance with the present invention, with an actuating element located at one end position.
Figure 4:
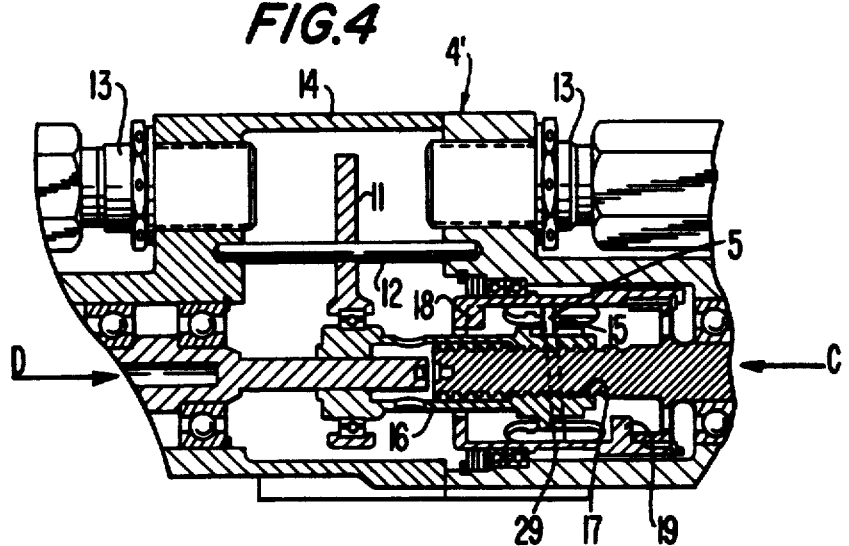
FIG. 4 is a partial cross-sectional view of the torque sensor arrangement of FIG. 3, with the actuating element located in a central position.
Figure 5:
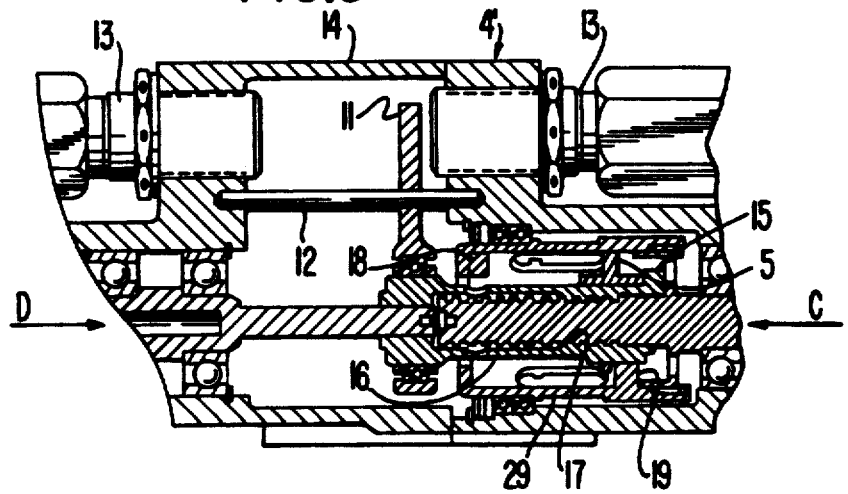
FIG. 5 is a partial cross-sectional view of the torque sensor arrangement of FIG. 3, with the actuating element located at a second end position.

To enable an absorbing of high impact forces which occur in a conventional relative motion sensor, in accordance with the present invention, a low spring rate mechanical stop mechanism generally designated by the reference numeral 15 may, as shown most clearly in FIGS. 3–5 be arranged on a threaded sleeve member or nut 16 cooperable with a threaded shaft portion 17 of a relative motion sensor 4', with an actuating element 11 being coupled to and displaceable by the sleeve member 16 so as to activate, for example, electrical switches 13. In a normal operation, the actuating element 11 is disposed substantially centrally of the switches 13 as shown in FIG. 4, with a failure in either the drive shafts of the primary load path resulting in a displacement of the actuating element to the left or right as shown in FIGS. 3 and 5 in the same manner as described hereinabove in connection with the relative motion sensor 4 of FIG. 2. However, unlike the torque sensor 4, the mechanical stop mechanism 15 provides shock absorbing of the high impact loads as the sleeve member 16 is displaced to the end or limit travel positions defined by fixed stops 18, 19.

The mechanical stop mechanism 15, as shown most clearly in FIGS. 6 and 7, includes a helical spring-like member S and a plurality of locating elements such as, for example, bars or projections 21–25, respectively disposed, for example, at the one o'clock, three o'clock, five o'clock, eight o'clock and ten o'clock positions with the locating bars or projections 21–25 serving to space the helical spring-like member of the stop mechanism 15 from the hub 20 on which the stop mechanism 15 is provided. While five bars or projections 21–25 are illustrated in FIG. 7, it is understood that the number of bars or projections may be varied, with the number of bars or projections being dictated by the mounting of the stop mechanism 15 concentrically with respect to the hub 20 and other components. For example, as shown in FIGS. 8 and 9, a stop mechanism 15' may be provided including three locating bars or projections 26–28 positioned respectively at the eleven o'clock, one o'clock, and six o'clock positions. The bars or projections in the stop mechanism 15 or 15' serve only to space the helical spring-like member at a predetermined distance from an outer diameter of the hub 20 or other cylindrical surface disposed immediately radially inwardly from the radially inward surfaces of the bars which are attached to the helical stop mechanism 15 or 15'.

The hub 20 and the nut 16 is a torque reaction device between the stop mechanism 15/15' and the hub/nut 20/16. In the illustrated embodiment, the key 32 is integral with the hub/nut 20/16. A key 32 (FIG. 6) to drive the stop mechanism 15 or 15' so that when the stop mechanism 15 or 15, contacts the stop 19 at the end of travel, the stop mechanism 15 or 15' is not connected to the shaft until the entire circumference of the spring member S is loaded in compression with the reaction force being taken out against the keyway. By simply using the compressive modulus of the material of the stop mechanism 15 or 15', the spring rate may be dropped to a point at which the impact loads can be accommodated without permanent deformation or peening of the stops 7 and/or 8.

Referring to FIG. 6, as the hub 20 rotates and travels in the direction of the arrow F, eventually one end face 30 of the helical spring member forming the stop mechanism 15 will contact a fixed stop such as, for example, fixed stop 19 provided on the cylindrical container 29 of the relative motion sensor 4' of FIGS. 3–5. When the end face 30 abuts the fixed stop 19, the end face 30 of the helical spring member S stops moving while the hub 20 wants to continue rotating. This results in a compression of the helical spring member S along its active spring length 1 to absorb this impact.

Naturally, when one end of the helical spring member S forming the stop mechanism 15 or 15' is stopped while the opposite end continues to move, the stop mechanism 15 or 15' will attempt to expand in a radially outward direction as the two end faces, namely, the contact face 30 and the reaction face 31 move circumferentially away from each other; however, the cylindrical container 29 prevents such movement. The helical spring member S is dimensioned such that the contact face 30 is separated from the reaction face 31 on the hub 20 by substantially at least one circumference of the hub 20.

By virtue of the above noted characteristics of the helical spring member forming the stop mechanism 15 or 15', a shock absorbing stop mechanism is provided which utilizes the compression of the material itself along its length 1 to provide a spring effect and the stop mechanism 15 or 15' of the present invention does not utilize any bending to provide the spring effect as would normally be expected.

While the stop mechanism 15 or 15' of the present invention has been described hereinabove in connection with the relative motion sensing arrangement for aircraft, as can readily be appreciated, the stop mechanism is readily applicable to various applications wherein a stop mechanism having shock absorbing characteristics are desirable such as, for example, in ball screw actuators, rotational counters, etc. Likewise, as can also be readily appreciated, while the stop mechanism 15 or 15' has been described hereinabove as a torsional stop version, the same technical concept is equally applicable to purely linear actuators impacting on a stop wherein one end of the stop mechanism reacts on the other end, with the shock absorbing being achieved by compression of the material. Moreover, the spring rate of the stop mechanism 15 or 15' can be advantageously varied and tailored to specific requirements by controlling a cross section thereof.

The stop mechanism 15 or 15' of the present invention is preferably made of a high strength material such as steel and, in relative motion sensing arrangements, has been effective in reducing the impact force loads by up to ten fold.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A mechanical stop mechanism adapted to be accommodated in a container having at least one fixed stop, the mechanical stop mechanism comprising:
   a rotatable and axially displaceable helical spring member adapted to be brought into engagement with the at least one fixed stop, said helical spring member having an active spring length dimensioned so as to absorb impacting forces of the stop mechanism against the at least one fixed stop by compression of material of the helical spring member,
   a hub means for supporting said helical spring, and
   wherein said helical spring member includes a plurality of axially extending circumferentially spaced locater means arranged along an inner cylindrical surface thereof for concentrically locating the helical spring means with respect to said hub means.

2. A mechanical stop mechanism according to claim 1, wherein said hub means is adapted to be mounted on a rotatable axially displaceable sleeve member of a relative motion sensor, said sleeve member including an actuator means for activating a signal means indicating an exceeding of a predetermined relative motion when said stop mechanism contacts said at least one stop and the helical spring member has absorbed said impact forces.

3. A mechanical stop mechanism according to claim 1, wherein the container includes two axially spaced fixed stops defining travel limit positions of the stop mechanism between which the helical spring member is displaceable.

4. A mechanical stop mechanism adapted to be accommodated in a container having at least two axially spaced fixed stops, the mechanical stop mechanism comprising:
   a rotatable and axially displaceable helical spring member adapted to be brought into engagement with the two axially spaced fixed stops, said fixed stops defining travel limit positions of the stop mechanism between which the helical spring member is displaceable, said helical spring member having an active spring length dimensioned so as to absorb impacting forces of the stop mechanism against the at least two fixed stops by compression of material of the helical spring member,
   a hub means for supporting said helical spring member, and
   wherein said helical spring member includes a plurality of axially extending circumferentially spaced locater means arranged along an inner cylindrical surface thereof for concentrically locating the helical spring member with respect to said hub means.

5. A mechanical stop mechanism according to claim 4, wherein said hub means is mounted on a rotatable axially displaceable sleeve member of a relative motion sensor for axial displacement therewith, said sleeve member including an actuator means for actuating a signal means indicating an exceeding of a predetermined relative motion when said stop mechanism contacts the respective fixed stops and the helical spring member has absorbed said impact forces.

* * * * *